United States Patent
Akhtar et al.

(10) Patent No.: US 11,169,529 B2
(45) Date of Patent: Nov. 9, 2021

(54) SYSTEMS AND METHODS FOR CONTROLLING VEHICLE MANOEUVERS

(71) Applicant: JAGUAR LAND ROVER LIMITED, Coventry (GB)

(72) Inventors: Naseem Akhtar, Warwickshire (GB); Brian Gerrard, Warwickshire (GB); Philip Barber, Warwickshire (GB); James Kelly, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 8 days.

(21) Appl. No.: 16/098,047

(22) PCT Filed: May 5, 2017

(86) PCT No.: PCT/EP2017/060814
§ 371 (c)(1),
(2) Date: Oct. 31, 2018

(87) PCT Pub. No.: WO2017/191314
PCT Pub. Date: Nov. 9, 2017

(65) Prior Publication Data
US 2019/0146510 A1    May 16, 2019

(30) Foreign Application Priority Data
May 6, 2016    (GB) ..................... 1607945

(51) Int. Cl.
*B62D 15/02*    (2006.01)
*G05D 1/02*    (2020.01)
(Continued)

(52) U.S. Cl.
CPC ......... *G05D 1/0214* (2013.01); *G05D 1/0055* (2013.01); *G05D 1/0219* (2013.01); *G05D 1/0274* (2013.01)

(58) Field of Classification Search
CPC .. G05D 1/0214; G05D 1/0055; G05D 1/0219; G05D 1/0274
See application file for complete search history.

(56) References Cited

U.S. PATENT DOCUMENTS

| | | | |
|---|---|---|---|
| 8,929,603 B1 * | 1/2015 | Maali | G06K 9/00771 382/103 |
| 2014/0120943 A1 * | 5/2014 | Shima | A01K 15/023 455/456.1 |
| 2020/0307559 A1 * | 10/2020 | Goricke | B62D 15/0285 |

FOREIGN PATENT DOCUMENTS

| | | | | |
|---|---|---|---|---|
| CN | 103253192 A | | 8/2013 | |
| EP | 1462342 A2 * | | 9/2004 | ........... B62D 15/027 |

(Continued)

OTHER PUBLICATIONS

Search and Examination Report, GB1607945.1, dated Nov. 8, 2016.
(Continued)

*Primary Examiner* — Adam D Tissot
(74) *Attorney, Agent, or Firm* — McCoy Russell LLP

(57) ABSTRACT

Embodiments of the present invention provide systems and methods for performing autonomous manoeuvers, especially when visibility is poor or it is unclear whether or not the terrain surrounding the vehicle is suitable for the vehicle to drive on. In some embodiments the systems are operable to detect user-defined boundaries to provide an improved determination as to whether or not the surrounding terrain is suitable for driving on.

19 Claims, 5 Drawing Sheets

(51) Int. Cl.
*G06F 7/00* (2006.01)
*G06F 17/00* (2019.01)
*G08G 1/14* (2006.01)
*G08G 1/00* (2006.01)
*G05D 1/00* (2006.01)

(56) References Cited

FOREIGN PATENT DOCUMENTS

| | | |
|---|---|---|
| EP | 1462342 A2 | 9/2004 |
| EP | 2405383 A1 | 1/2012 |
| WO | 2015006600 A1 | 1/2015 |

OTHER PUBLICATIONS

Search and Examination Report, GB1707200.0, dated May 30, 2017.
International Search Report and Written Opinion, PCT/EP2017/060814, dated Oct. 9, 2017.

* cited by examiner

SYSTEMS AND METHODS FOR CONTROLLING VEHICLE MANOEUVERS

CROSS-REFERENCE TO RELATED APPLICATIONS

This application is a 371 of International Application No. PCT/EP2017/060814, filed May 5, 2017, which claims priority to GB Patent Application 1607945.1, filed May 6, 2016, the contents of both of which are incorporated by reference herein in their entirety.

TECHNICAL FIELD

The present disclosure relates to systems and methods for controlling vehicle manoeuvers and particularly, but not exclusively, to systems and methods for controlling vehicle manoeuvers in poor visibility conditions and/or where limited space is available. Aspects of the invention relate to a system, a controller, a computer program product, a non-transitory computer readable medium, a processor, a vehicle and a method.

BACKGROUND

Some modern vehicles have the capability to perform manoeuvers substantially autonomously. During such autonomous manoeuvers the user allows the vehicle to control the steering to manoeuver the vehicle to a destination which has been set by the user or which has been identified by the vehicle. The user may retain control of the powertrain controls (i.e. the accelerator pedal, the brake pedal, the gear selector and the clutch pedal in vehicles with manual transmissions) during the manoeuver, or the vehicle may control at least some of these inputs as well.

During an autonomous manoeuver a vehicle will determine which parts of terrain surrounding the vehicle are suitable for driving on using inputs from one or more sensors, and will control the vehicle such that it only drives on terrain that the vehicle has determined to be suitable. However, under some circumstances, for example if visibility is poor, or the vehicle is surrounded by vegetation such as in an off-road situation, the sensors may not be able to accurately determine which parts of the terrain are suitable for driving on.

It is an object of embodiments of the invention to at least mitigate one or more of the problems of the prior art.

SUMMARY OF THE INVENTION

Aspects and embodiments of the invention provide a system, a controller, a computer program product, a non-transitory computer readable medium, a processor, a vehicle and a method as claimed in the appended claims.

According to an aspect of the invention, there is provided a system for a vehicle, the system comprising:
  sensing means for obtaining environment data indicative of an environment proximal to the vehicle and boundary data indicative of a user-defined boundary placed in relation to the vehicle by a user; and
  control means for communicating with said sensing means and being configured to determine a first zone of terrain proximal the vehicle,
  wherein the control means is configured to:
  define the first zone in dependence on said environment data; and
  adjust the first zone in dependence on said boundary data.

The adjustment of the first zone may be arranged to at least partially extend the first zone if at least part of the user-defined boundary is outside the first zone as defined prior to the adjustment. Alternatively, or in addition thereto, adjustment of the first zone may be arranged to at least partially reduce the first zone if at least part of the user-defined boundary is inside the first zone as defined prior to the adjustment.

The control means may be configured to inhibit the vehicle from travelling outside of the first zone when the vehicle is operating in an at least semi-autonomous mode thereof.

The control means may be configured to generate a visual representation of at least a portion of the first zone with respect to the current vehicle position.

The control means may be configured to generate an alert if the vehicle approaches or reaches a boundary of the first zone.

It will be understood that the first zone is considered to be extended by an adjustment if any terrain that was not in the first zone prior to the adjustment is included in the first zone after the adjustment. Accordingly, the first zone may be considered to be extended by an adjustment even if the overall area of the first zone is reduced by the adjustment.

Optionally, the environment data may comprise terrain data.

Optionally, the system comprises means for allowing a user to place a user-defined boundary. The means for allowing a user to place a user-defined boundary may comprise one or more discrete or continuous markers.

In an embodiment the defining the first zone in dependence on said environment data comprises defining the first zone to comprise driving terrain with a confidence level that exceeds a first threshold value. It will be understood that the term "driving terrain" refers to terrain that is suitable for a vehicle to drive on. The confidence level for a given region of terrain may be the confidence with which the system has determined that the region of terrain is driving terrain based upon the environment data available to the system. The first threshold value may be selected to ensure that a probability that the vehicle will drive on unsuitable, non-driving, terrain during an autonomous manoeuver is very small.

Optionally, the adjusting the first zone in dependence on said boundary data comprises defining the first zone to comprise driving terrain that is between the vehicle and the user-defined boundary and that has a confidence level that exceeds a second threshold value, said second threshold value being less than said first threshold value. Advantageously, this may cause the amount of terrain in the first zone after placement of the user-defined boundary to be more than the amount of terrain in the first zone prior to placement of the user-defined boundary. Providing a non-zero second threshold may enable the system to avoid obstacles that are located between the vehicle and the user-defined boundary. Alternatively, said second threshold value may be substantially zero, whereby the system is configured to define the first zone to comprise substantially all of the terrain that is between the vehicle and the user-defined boundary.

In an embodiment the system is configured to communicate with a notification means of the vehicle and the system is configured to control said notification means to issue a notification indicating that a user-defined boundary is required when said first zone does not satisfy a space requirement of a manoeuver that a user has indicated the vehicle should perform.

Optionally, the notification means comprises a human machine interface (HMI).

In an embodiment the sensing means comprises a first sensing means to detect the user-defined boundary. Optionally, the first sensing means comprises one or more boundary sensors. Such boundary sensors may be adapted to detect a predetermined type of user-defined boundary.

In an embodiment the sensing means comprises a second sensing means to sense the environment data. Optionally, the second sensing means comprises one or more environment sensors.

In an embodiment the sensing means comprises an imaging means arranged to detect light in the visible, infra-red or ultraviolet spectrum. Such an imaging means may be operable to detect one or both of environment data and boundary data. Optionally, the imaging means is a camera. In embodiments where the camera is arranged to detect environment data and boundary data the overall number of sensors required by the system may be reduced.

Optionally, the sensing means comprises a scanning laser arranged to obtain said environment data. A scanning laser may be operable to detect environment data in the form of a point cloud representation of the terrain surrounding the vehicle.

In an embodiment, the user-defined boundary comprises a substance that may be applied to the terrain surrounding the vehicle by a user. Optionally, the substance can be a substance that may be sprayed onto the terrain surrounding the vehicle by a user. Use of such a substance may provide the user with significant flexibility when placing the user-defined boundary. Optionally, the means for allowing a user to place a user-defined boundary comprises a substance that may be applied to the terrain surrounding the vehicle, for example a spray.

In an embodiment the user-defined boundary comprises one or more discrete markers. Optionally, the means for allowing a user to place a user-defined boundary comprises one or more discrete markers.

In an embodiment the boundary sensing means comprises a user interface means configured to:
  display a representation of at least a portion of said environment data; and
  receive a driver input indicative of a desired position of the boundary on the representation of the terrain, wherein the control means is configured to calculate a position of the boundary in dependence on said driver input. This may allow a user to place the user-defined boundary without leaving the vehicle. Optionally, the means for allowing a user to place a user-defined boundary comprises a user interface operable to display a representation of at least a portion of said environment data and receive a driver input indicative of a desired position of the boundary on the representation of the terrain. The user interface means may be a graphical user interface, a voice activated user interface, or any other suitable user interface.

In an embodiment, said sensing means comprises one or more sensors configured to obtain environment data and boundary data, and said control means comprises is a controller comprising an electronic processor electrically coupled to an electronic memory and to said sensing means, said electronic memory having instructions stored thereon, the processor being configured to access the electronic memory and execute the instructions stored thereon such that it is operable to define a first zone of the terrain proximal the vehicle and to inhibit the vehicle from travelling outside of the first zone when the vehicle is operating in an at least semi-autonomous mode thereof
  wherein:
    if the boundary data indicates that the user-defined boundary is not present proximal the vehicle, the control means is configured to define the first zone to comprise driving terrain with a confidence level that exceeds a first threshold value; and
    if the boundary data indicates that the user-defined boundary is present proximal the vehicle, the control means is configured to define the first zone to comprise driving terrain that is between the vehicle and the user-defined boundary and with a confidence level that exceeds a second threshold value, said second threshold value being less than said first threshold value. Optionally, the sensing means comprises at least one boundary sensor and at least one environment sensor.

According to another aspect of the invention there is provided a controller for a vehicle, the controller comprising:
  data input means being configured to obtain environment data and boundary data from one or more sensing means, the environment data being indicative of an environment proximal to the vehicle and the boundary data being indicative of the position of a user-defined boundary that may be placed proximal to the vehicle by a user; and
  control means, the control means being configured to define a first zone of the terrain proximal the vehicle
  wherein the controller is configured to:
  define the first zone in dependence on said environment data; and
  adjust the first zone in dependence on said boundary data.

According to another aspect of the invention there is provided a method of operating a vehicle, the method comprising:
  receiving environment data indicative of an environment proximal to the vehicle;
  receiving boundary data indicative of the position of a user-defined boundary that may be placed proximal the vehicle by a user;
  defining a first zone of the terrain proximal the vehicle;
  adjusting the first zone in dependence on said boundary data.

Optionally, the adjustment of the first zone is arranged to at least partially extend the first zone if at least part of the user defined boundary is outside the first zone as defined prior to the adjustment. Optionally, the vehicle is inhibited from travelling outside of the first zone when the vehicle is operating in an at least semi autonomous mode thereof.

Optionally the method comprises communicating with a notification means of the vehicle to control said notification means to issue a notification indicating that a user-defined boundary is required when said first zone does not satisfy a space requirement of a manoeuver that a user has indicated the vehicle should perform. This may avoid the necessity for the user to place a user-defined boundary if it is possible to complete the manoeuver without a user-defined boundary.

Optionally the boundary data is detected using a camera arranged to detect light in the visible, infra-red or ultraviolet spectrum.

Optionally the terrain data is detected using a scanning laser.

Optionally, the user-defined boundary comprises a substance that may be sprayed onto the terrain surrounding the vehicle by a user.

Optionally the user-defined boundary comprises one or more discrete markers.

Optionally, the boundary data is obtained via a user interface configured to:
  display a representation of the terrain; and
  receive a driver input indicative of a desired position of the boundary on the representation of the terrain,
  wherein the control means is configured to calculate a position of the boundary in dependence on said driver input.

According to another aspect of the invention there is provided a computer program product executable on a processor so as to implement a method as defined above.

According to another aspect of the invention there is provided a non-transitory computer readable medium carrying computer readable code which when executed causes a vehicle to carry out a method as defined above.

According to another aspect of the invention there is provided a processor arranged to implement a method or a computer program product as defined above.

According to another aspect of the invention there is provided a vehicle comprising a system, a controller, a computer program product, a non-transitory computer readable medium or a processor as defined above.

According to another aspect of the invention, there is provided a system for a vehicle, the system comprising:
  sensing means for obtaining environment data indicative of an environment proximal to the vehicle; and
  control means for communicating with said sensing means and being configured to determine a first zone of terrain proximal the vehicle,
  wherein the control means is configured to:
  define the first zone in dependence on said environment data, wherein the defining the first zone in dependence on said environment data comprises defining the first zone to comprise driving terrain with a confidence level that exceeds a first threshold value.

Adjusting the first zone in dependence on said boundary data may comprise defining the first zone to comprise driving terrain that is between the vehicle and the user-defined boundary and that has a confidence level that exceeds a second threshold value, said second threshold value being less than said first threshold value. The confidence level may be the level of confidence that the system has that a given region of terrain is suitable for driving on and therefore comprises driving terrain. The confidence level may for example be calculated by the system in dependence on said environment data. The second threshold value may be substantially zero, whereby the system is configured to define the first zone to comprise substantially all of the terrain that is between the vehicle and the user-defined boundary.

According to another aspect of the invention, there is provided a method of operating a vehicle, the method comprising:
  receiving, from sensors, environment data indicative of an environment proximal to the vehicle; and
  defining a first zone of the terrain proximal the vehicle, wherein the defining the first zone in dependence on said environment data comprises defining the first zone to comprise driving terrain with a confidence level that exceeds a first threshold value.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
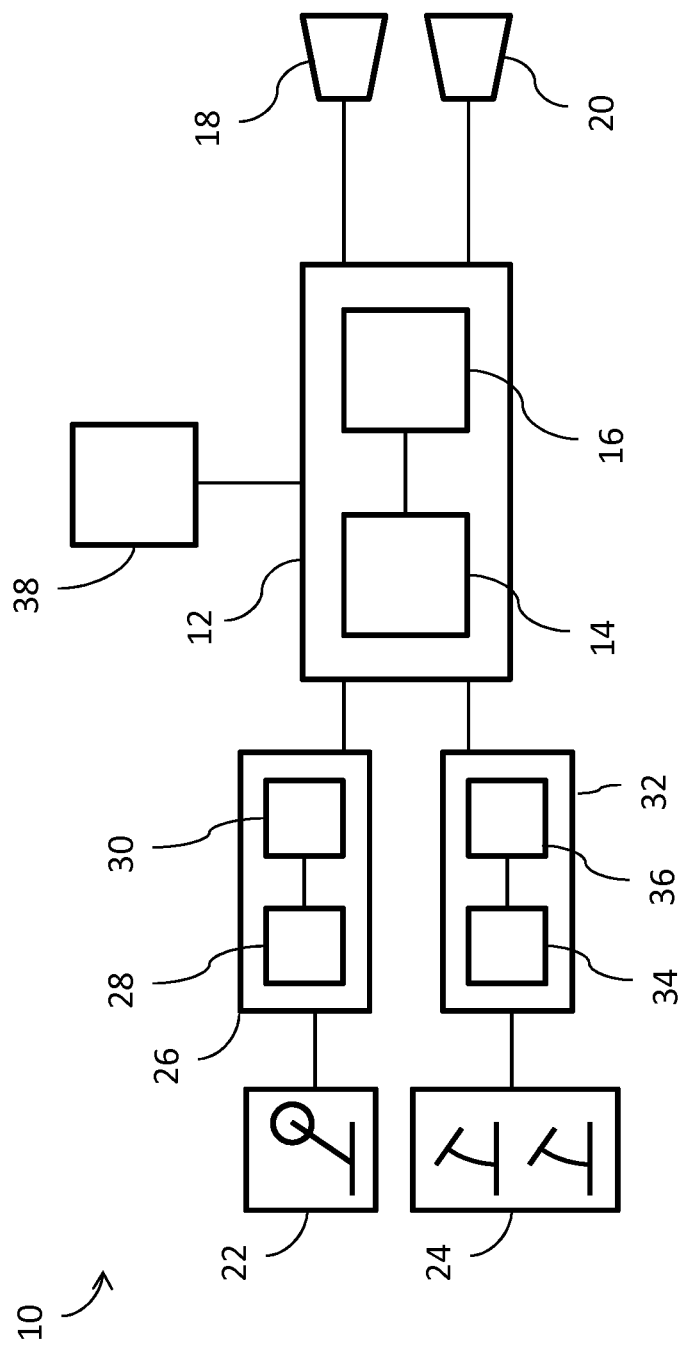
FIG. 1 shows a block diagram of a system for a vehicle in an embodiment of the present invention.
Figure 5:
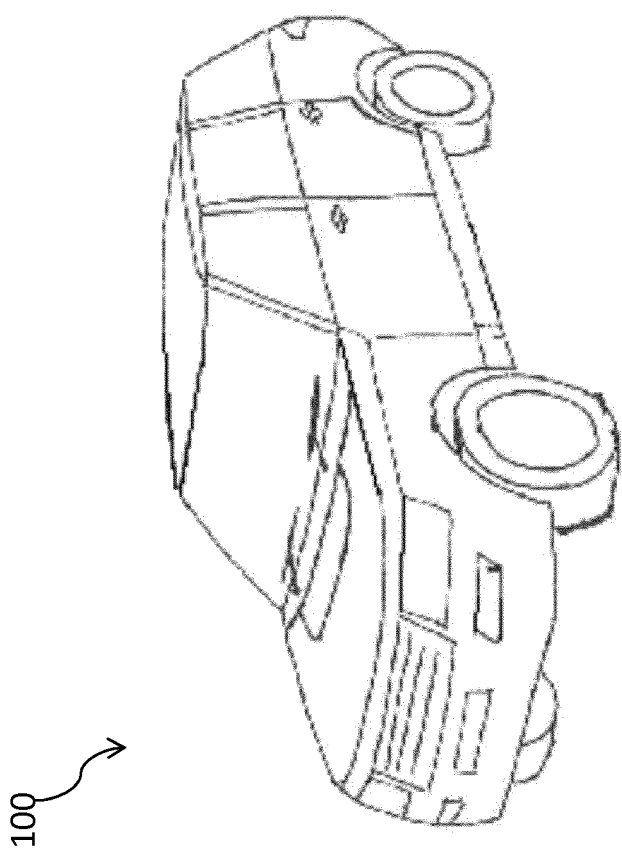
FIG. 5 shows a vehicle in an embodiment of the present invention.

FIG. 1 shows a system 10 in an embodiment of the present invention, and FIG. 5 shows a vehicle 100 in which the system shown in FIG. 1 may be installed. The system 10 comprises a control means 12, which is an autonomous manoeuver controller in the illustrated embodiment. The autonomous manoeuver controller 12 comprises a memory means in the form of an electronic memory 14 and a processing means 16 communicably coupled to the electronic memory. In the illustrated embodiment the processing means is a processor. Autonomous manoeuver controller 12 has input means comprising one or more electrical inputs arranged to communicate with one or more sensing means. The sensing means are preferably mounted on/to the vehicle. In the illustrated embodiment the sensing means comprises one or more environment sensors 18 which are configured to receive information relating to the environment surrounding the vehicle and to produce environment data indicative of the received information relating to the environment surrounding the vehicle. The sensing means also comprises one or more boundary sensors 20 which are configured to receive information relating to the location of a user-defined boundary and to produce boundary data indicative of the received information relating to the location of a user-defined boundary. However, it will be understood that one or more individual sensors may be configured to receive both boundary information and environment information, and to produce both environment data and boundary data, so in some embodiments the sensing means may not be divided into boundary sensors 20 and environment sensors 18.

Autonomous manoeuver controller 12 is coupled to user input means in the form of a user interface 38 so that signals indicative of an input that has been provided by a user at the user interface can be communicated to the autonomous manoeuver controller 12. The user interface 38 may be a touch screen or any other suitable user interface such as a voice input or gesture recognition interface. In any event, user interface 38 is configured to receive an input indicative of a user request for the vehicle to perform an autonomous manoeuver and to communicate a signal indicative of such a request to the autonomous manoeuver controller 12. Upon receipt of the request to perform an autonomous manoeuver, the autonomous manoeuver controller 12 is configured to initiate autonomous control of a vehicle 100 by communicating with steering system controller 26 and in some embodiments powertrain system controller 32. Steering system controller 26 and in some embodiments powertrain controller 32 are both communicably coupled to the autonomous manoeuver controller 12.

Steering system controller 26 comprises a processor 28 and an electronic memory 30 and is communicably coupled to an actuator means of a power steering system 22, for example an electric motor or hydraulic system. Steering system controller 26 is configured to provide electrical inputs to the actuator of the power steering system 22, thereby to control the steering of a vehicle 100.

Powertrain system controller 32 comprises a processor 34 and an electronic memory 36 and is communicably coupled to one or more powertrain control actuators 24. For example, the powertrain system controller may be communicably coupled with a linear actuator configured to control an accelerator pedal of the vehicle 100 and a linear actuator configured to control a brake pedal of the vehicle 100. In some embodiments, especially embodiments in which the vehicle 100 has a manual transmission, the powertrain system controller may also be configured to control actuators that control a clutch pedal and/or a gear selector of the vehicle 100. Powertrain system controller 26 is configured to provide inputs to the actuators that control the pedals and/or gear selector of the vehicle, thereby to control the powertrain of a vehicle 100. Alternatively, the powertrain system controller 32 may not be operable to directly control the pedals and may instead provide inputs directly to the systems that are controlled in dependence on the position of the pedals. For example in vehicles having "drive-by-wire" powertrain control in which the user's inputs to the pedals are converted to electrical signals indicative of the position of the pedals the powertrain system controller 32 may provide electrical signals to the systems that are controlled by the pedals, which signals may replace the signals indicative of the position of the pedals when the vehicle is operating in an autonomous mode thereof.

Although the embodiment shown in FIG. 1 illustrates an autonomous manoeuver controller 12 that is communicably coupled with powertrain system controller 32, it will be understood that in some embodiments the system will not be operable to provide inputs to the powertrain system controller 32 and indeed a powertrain system controller 32 may not be provided as part of the system 10. In such embodiments the user may retain control of the accelerator and brake pedals (and also the clutch pedal and gear selector for vehicles with manual transmissions) during autonomous manoeuvers. The vehicle may provide the user with instructions regarding what motive control inputs are required from them to complete the manoeuver.

Upon receipt of a request to perform an autonomous manoeuver from the user interface 38 the autonomous manoeuver controller 12 is configured to determine a first zone of the terrain surrounding the vehicle such that the first zone comprises only terrain that controller 12 has determined that the vehicle can drive on. The autonomous manoeuver controller 12 only includes terrain in the first zone if it has determined that the terrain is suitable for the vehicle to drive on with a sufficiently high confidence level.

The first zone is typically defined in dependence on environment data received from environment sensors 18. In the illustrated embodiment the environment sensing means 18 comprises a plurality of scanning lasers arranged to generate a point cloud representation of the terrain surrounding the vehicle as well as any obstacles that may be present in the vicinity of the vehicle. It will be understood that a single scanning laser could also be used to generate a point cloud representation of the environment surrounding a vehicle. However, using more than one scanning laser may improve the speed with which such a representation can be generated and may provide a larger field of view than a single scanning laser.

Figure 2:
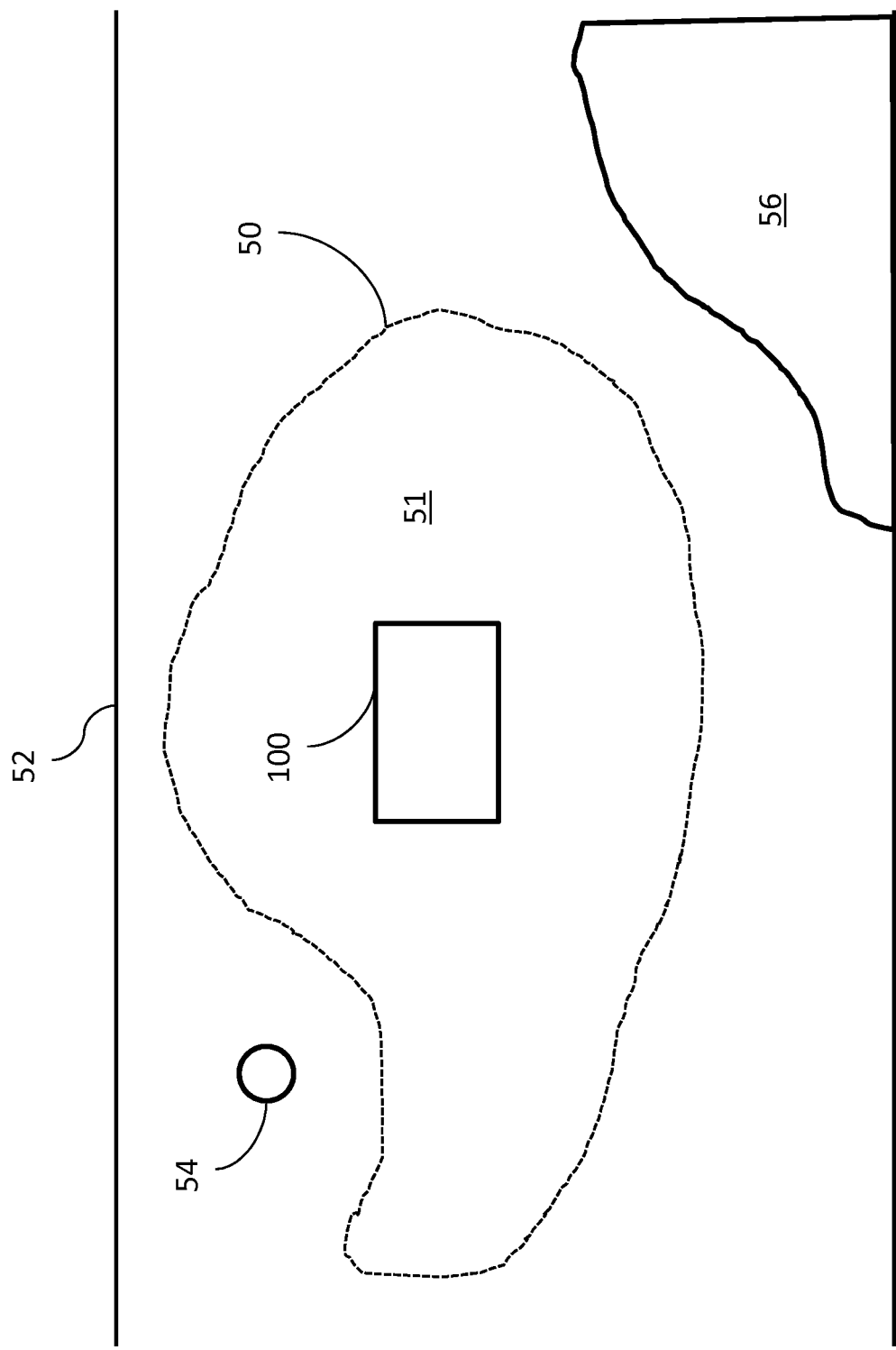
FIG. 2 shows a graphical representation of a digital map that is generated by a system in embodiments of the present invention.

FIG. 2 shows a vehicle 100 located on terrain comprising track edges 52, for example one or more of raised curbs, ditches, trenches, cliff edges etc. an obstacle 54, for example a traffic cone or tree stump, and a region of poor quality terrain 56, for example a region of flooded or boggy terrain that is not suitable for driving on. FIG. 2 also shows a boundary 50 of a first zone 51 as defined by an embodiment of the autonomous manoeuver controller 12 of the system 10 that is installed in the vehicle 100. The controller 12 is not able to detect a user-defined boundary via boundary sensors 20 (because no user-defined boundary is present), so the position of the boundary 50 is determined solely based on the environment data received from environment sensors 18. As can be seen in FIG. 2, the first zone 51 has been defined so as to prevent the vehicle from driving over the track edges 52, the obstacle 54 or the region of poor quality terrain 56. However, the first zone also excludes a significant proportion of the terrain surrounding the vehicle that would, in fact, have been suitable for the vehicle to drive on. This may be because the prevailing conditions prevent the autonomous vehicle controller 12 from determining that the terrain outside the first zone 51 is suitable for driving on with sufficient confidence based on the information from the environment sensors 18 alone.

In the situation illustrated in FIG. 2 the vehicle may be unable to perform an autonomous manoeuver because the controller 12 has not been able to determine that there is sufficient space to perform the manoeuver. The controller 12 may communicate the fact that the vehicle is unable to perform an autonomous manoeuver to a user of the vehicle via user interface 38. Furthermore, the controller may output a request that the user places a boundary that they consider to be safe for the vehicle to operate in. The request may be output via user interface 38. As will be described in more detail below, placement of a user-defined boundary may enable the vehicle to perform an autonomous manoeuver in situations where the vehicle would have been unable to perform the manoeuver without a user-defined boundary.

Figure 3:
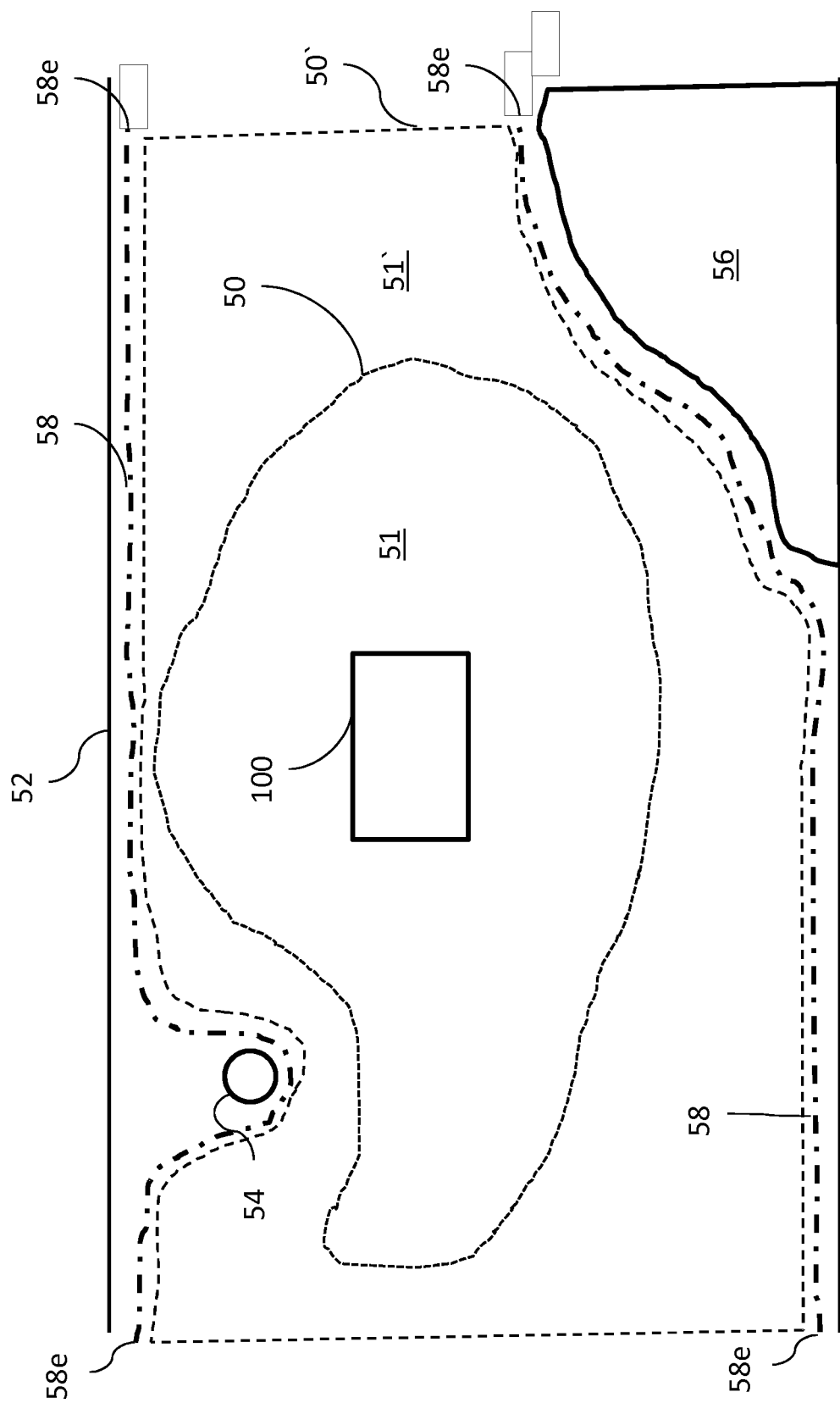
FIG. 3 shows a graphical representation of another digital map that is generated by a system in embodiments of the present invention.

FIG. 3 shows a vehicle 100 in the same terrain as FIG. 2. However, in FIG. 3 a user-defined boundary 58 has been placed in the terrain proximal the vehicle 100, with the obstacle 54, the track edges 52 and the region of poor quality terrain on the opposite side of the boundary 58 to the vehicle 100. User defined boundary 58 is placed or located by a user such that they consider the terrain between the vehicle 100 and the boundary 58 to be suitable for driving on.

User defined boundary 58 may comprise any boundary marking means that can be detected by boundary sensors 20 and positively recognised as a user-defined boundary. For example, the user-defined boundary may comprise temporary marking means such as a spray that can be placed on or applied to the terrain proximal the vehicle 100 by a user and that can be detected by the boundary sensors 20. The spray may reflect light at a given wavelength or wavelength band, optionally a wavelength or wavelength band in the ultraviolet portion of the electromagnetic spectrum, and the boundary sensor 20 may be a light sensor such as a camera that is operable to detect light at the given wavelength or wavelength band. Alternatively the spray may be fluorescent or phosphorescent, and the boundary sensors 20 may be arranged to detect light at the wavelength or wavelength band at which the spray is fluorescent or phosphorescent.

In other embodiments the user-defined boundary 58 may comprise a plurality of discrete markers such as flags that can be arranged to form a perimeter such as a linear or annular boundary. The discrete markers may be of a predetermined colour or have a reflective portion, a fluorescent portion or a phosphorescent portion, or they may be operable to communicate with the vehicle by known short range communication methods such as radio-frequency identification or Bluetooth®. It will be understood that in a given embodiment the boundary sensor 20 will be a sensor that is operable to determine the position of the boundary 58 for the embodiment. Furthermore, the boundary sensor 20 may be operable to obtain environment data as well as boundary data.

In another embodiment the user-defined boundary may be placed on a visual representation of the terrain surrounding the vehicle 100 that may be displayed on a user interface, for example user interface 38 or a different user interface. The user interface may comprise a touch screen that is operable to receive a user input indicative of a desired placement of the user-defined boundary. Accordingly, the boundary sensor 20 may, in fact, be a sensor arranged to detect an input from a user indicative of a desired placement of the user-defined boundary 58.

In embodiments where the boundary 58 is at least partially reflective the system or boundary marker may comprise light emitting means such as a light source operable to emit light at the wavelength or within the wavelength band that the boundary 58 is operable to reflect and the sensors are operable to detect, so as to enhance the intensity of the light reflected by the user-defined boundary. Furthermore, in embodiments where the boundary 58 is at least partially fluorescent or phosphorescent the system may comprise a light source operable to emit light at a wavelength that excites the fluorescence or phosphorescence of the boundary, so as to enhance the intensity of the light emitted by the user-defined boundary.

Upon detection of the user-defined boundary 58 the controller 12 adjusts the first zone 51 so that it includes substantially all of the terrain between the vehicle 100 and the boundary 58, as illustrated by adjusted first zone 51', which extends as far as adjusted first zone boundary 50'. Accordingly, the first zone is extended beyond the terrain that was originally defined as the first zone 51. This may allow the vehicle 100 to perform an autonomous manoeuver within the adjusted first zone 51' that would not have been possible within the first zone 51 that was defined solely on the basis of the environment data received via environment sensors 18.

As can be seen in FIG. 3, the user-defined boundary 58 does not fully surround the vehicle 100. Instead, two separate lines each having two ends 58e have been placed by the user. As the system 10 is unable to detect a boundary that fully encircles the vehicle 100 the system linearly interpolates the boundary between the adjacent ends of the user-defined boundary 58, and proceeds as if the user-defined boundary had connected the adjacent ends 58e using straight lines. In other embodiments different methods of interpolation may be used, or a continuous boundary may be required.

In the embodiment illustrated in FIG. 3 the adjusted boundary of the first zone 50' is slightly inside the user-defined boundary. However, it will be understood that in some embodiments the boundary of the first zone will extend all the way up to i.e. be co-terminus with the user-defined boundary 58.

Figure 4:
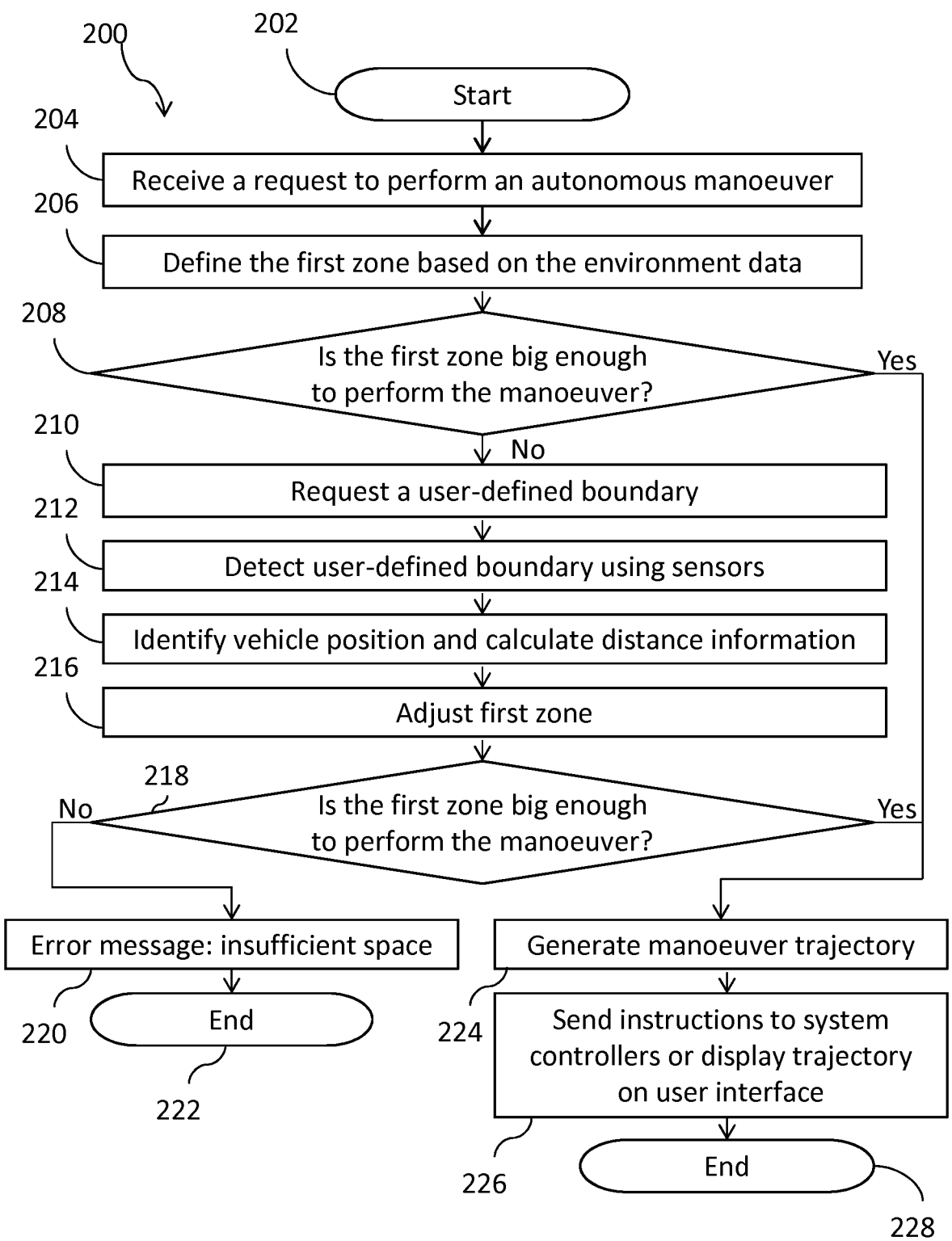
FIG. 4 shows a flow chart illustrating a method of operating a vehicle in an embodiment of the present invention.

FIG. 4 shows a flowchart 200 illustrating a method of performing an autonomous manoeuver in an embodiment of the present invention in more detail, which method may be implemented by the controller 12 or a processor 14. The method begins at step 202 with the system waiting to receive an input indicative of a request to perform an autonomous manoeuver at step 204. Once an input indicative of a request to perform an autonomous manoeuver is received the method proceeds to step 206, in which the system defines the first zone in dependence on environment data, which is received via the one or more environment sensors 18. The system then determines whether or not there is sufficient space in the first zone to perform the requested manoeuver in step 208. For example, the system may calculate a space requirement of the manoeuver or a space requirement of the manoeuver may be stored in memory 14, and the controller may determine whether or not the first zone satisfies the space requirement. The space requirement may comprise a requirement that the available space such as the road width exceeds a minimum safe road width, a requirement that at least a minimum safe road width is maintained for a minimum longitudinal distance away from the manoeuver location, or a requirement that, for a portion of the road around the manoeuver location, the road width exceeds a variable minimum safe road width, which varies as a function of longitudinal distance from the manoeuver location.

If the first zone is not big enough to perform the manoeuver then an output is provided to request a user-defined boundary at step 210. For example, an output may be sent to user interface 38 instructing the user interface 38 to display a prompt or to output a voice instruction asking the user to place a user-defined boundary in relation to the vehicle 100. Once the user has placed the user-defined boundary it is detected at step 212 using one or more boundary sensors 20. The method then proceeds to step 214, in which the controller 12 identifies the vehicle 100 position relative to the user-defined boundary and calculates distance information indicative of the distance between the vehicle 100 and the user defined boundary in several different directions. The first zone is then adjusted in dependence on the boundary data at step 216.

In some embodiments the first zone may be defined to comprise terrain that the controller 12 has determined to be driving terrain with a given confidence level. For example, when defining the first zone in step 206 the controller may decompose the terrain surrounding the vehicle into a plurality of small regions and may calculate a confidence level that the region is suitable driving terrain for each of the regions. The first zone may then be defined so as to only include regions in which the calculated confidence level is above a first threshold value. The first threshold value will typically be selected so as to ensure that the probability of the vehicle driving in terrain that is not suitable for the vehicle to drive on is very low. A lower value of the first threshold value may be used if the system is only partially autonomous, for example if only the steering input is controlled by the system and the user retains control of the powertrain controls. This is because the user may be more likely to recognise that the vehicle is travelling onto unsuitable terrain when they retain partial control during the manoeuver. It will be understood that the term "driving terrain" refers to terrain that is suitable for driving on.

When adjusting the first zone in step 216 the controller may define the first zone to comprise terrain that is between the boundary and the vehicle 100 and that has a confidence level that is greater than a second threshold value, said second threshold value being less that the first threshold value. Furthermore, the controller 12 may define all of the terrain that is on the opposite side of the boundary to the vehicle 100 to be outside the first zone. The second threshold value may be significantly less than the first threshold value, because the user-defined boundary provides an indication that the user believes the terrain to be safe. However, providing a non-zero second threshold value may allow the vehicle to avoid clearly unsuitable terrain or obstacles even if the user has placed the user-defined boundary such that clearly unsuitable terrain or an obstacle is between the vehicle and the boundary. Alternatively, the controller 12 may define the adjusted first zone to include substantially all of the terrain between the vehicle and the user-defined boundary, or a predetermined portion thereof, to be in the adjusted first zone. This may be considered equivalent to a second threshold value of zero.

Once the first zone has been adjusted, the method moves on to step 218, in which it is determined whether or not the manoeuver can be completed in the adjusted first zone. The controller 12 may determine whether or not the adjusted first zone meets a space requirement of the manoeuver to decide whether or not the adjusted first zone is big enough to perform the manoeuver. If the first zone is still too small to perform the manoeuver in then an error message stating that there is insufficient space to perform the requested manoeuver is outputted, for example via user interface 38 and the method ends at step 222.

If the first zone is determined to be big enough to perform the manoeuver in, either in step 208 or in step 218 then the processor 14 generates a manoeuver trajectory which can be followed to perform the manoeuver without straying outside the first zone. The controller 12 may then output instructions that will cause the vehicle to follow the calculated trajectory to the steering system controller 26 and/or the powertrain system controller 32. Alternatively, the trajectory may be displayed on user interface 38 along with instructions and feedback relating to the steering inputs that are required to perform follow the generated trajectory and complete the manoeuver. Once the manoeuver requested at step 204 has been completed, the method ends at step 228.

Within the scope of the present application a manoeuver is considered to be at least semi-autonomous if the steering input is controlled by the vehicle during the manoeuver or if the vehicle provides the driver with feedback regarding what steering input to provide during manoeuver.

While in the above, embodiments are described in which the present technique is applied to a semi-autonomous vehicle, with the zone being used to inhibit travel outside the zone, it may also be applied in other ways. For example, where the vehicle is manually controlled (either because it lacks autonomous functionality or because it is currently operating in a non-autonomous mode), the zone may still be used to constrain travel of the vehicle. In other words, if a driver of the vehicle attempts to manoeuvre the vehicle outside of the zone, this may be inhibited. Alternatively, rather than the zone being used to constrain movement of the vehicle, it may be used in an advisory capacity instead. For example, if the driver should approach, reach or cross a boundary of the zone, an alert may be generated—for example in the form of an audible or visual alarm or another form of feedback. The zone may be displayed to the driver, for example on a display screen mounted inside the vehicle.

At a simplistic level such a display could simply represent the boundaries of a driveable area surrounding the vehicle, or may include further detail relating to obstructions (for example rocks, shrubs, trees), surfaces (for example sand, gravel, mud, shingle, road surface), relief (peaks and troughs in the terrain) and other features.

While in the above-described embodiment the zone is extended if at least part of the user-defined boundary is outside the zone, it is also possible for the zone to be at least partially reduced if at least part of the user-defined boundary is inside the zone. In this case, an area of the zone (before adjustment) which is outside of the user-defined boundary is removed from the zone. In effect, this permits a user to "override" the automatic terrain determination carried out to form the zone to allocate a portion of the zone as impassable. It will be appreciated that where parts of the user-defined boundary are outside of the zone (before adjustment) and parts of the user-defined boundary are inside of the zone (before adjustment), the zone may be extended in some areas and reduced in other areas.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A system for a vehicle, the system comprising: sensing means for sensing an environment proximal to the vehicle to obtain environment data and for sensing a tangible user-defined boundary that is physically placed in terrain proximal to the vehicle by a user to obtain boundary data; and control means for communicating with said sensing means and being configured to determine a first zone of terrain proximal to the vehicle, wherein the control means is configured to: define the first zone based on said environment data; adjust the first zone based on said boundary data; and inhibit the vehicle from travelling outside of the first zone when the vehicle is operating in an at least semi-autonomous mode; wherein the system is configured to communicate with a human machine interface (HMI) of the vehicle and wherein the system is further configured to control said HMI to issue a notification indicating that a user-defined boundary is required when said first zone does not satisfy a space requirement of a manoeuvre that a user has indicated the vehicle should perform.

2. A system as claimed in claim 1, wherein said adjustment of the first zone is arranged to at least partially extend the first zone if at least part of the tangible user-defined boundary is outside the first zone as defined prior to said adjustment.

3. A system as claimed in claim 1, wherein said adjustment of the first zone is arranged to at least partially reduce the first zone if at least part of the tangible user-defined boundary is inside the first zone as defined prior to said adjustment.

4. A system as claimed in claim 1, wherein the control means is further configured to generate a visual representation of at least a portion of the first zone with respect to the current vehicle position.

5. A system as claimed in claim 1, wherein the control means is further configured to generate an alert if the vehicle approaches or reaches a boundary of the first zone.

6. A system as claimed in claim 1, wherein the defining the first zone based on said environment data comprises defining the first zone to comprise driving terrain with a confidence level that exceeds a first threshold value.

7. A system as claimed in claim 6, wherein the adjusting the first zone based on said boundary data comprises defining the first zone to comprise driving terrain that is between the vehicle and the tangible user-defined boundary and that has a confidence level that exceeds a second threshold value, said second threshold value being less than said first threshold value.

8. A system as claimed in claim 6, wherein said confidence level is the level of confidence that the system has that a given region of terrain is suitable for driving on and therefore comprises driving terrain.

9. A system as claimed in claim 8, wherein said confidence level is calculated by the system based on said environment data.

10. A system as claimed in claim 6, wherein said second threshold value is substantially zero, whereby the system is configured to define the first zone to comprise substantially all of the terrain that is between the vehicle and the tangible user-defined boundary.

11. A system as claimed in claim 1, wherein the sensing means comprises a first sensing means to detect the tangible user-defined boundary.

12. A system as claimed in claim 1, wherein the tangible user-defined boundary comprises a substance that is applied to the terrain surrounding the vehicle by a user.

13. A system as claimed in claim 1, wherein the tangible user-defined boundary comprises one or more discrete markers.

14. A system as claimed in claim 1, wherein the boundary sensing means comprises a user interface means configured to:
display a representation of at least a portion of said environment data; and
receive a driver input indicative of a desired position of the boundary on the representation of the terrain, wherein the control means is further configured to calculate a position of the boundary based on said driver input.

15. A system as claimed in claim 1, further comprising means for allowing a user to place the tangible user-defined boundary.

16. A controller for a vehicle, the controller comprising: sensing means configured to sense an environment proximal to the vehicle to obtain environment data and also to sense a tangible user-defined boundary that is physically placed in terrain proximal to the vehicle by a user to obtain boundary data; and control means configured to define a first zone of the terrain proximal the vehicle; wherein the controller is configured to: define the first zone based on said environment data; adjust the first zone based on said boundary data; and inhibit the vehicle from travelling outside of the first zone when the vehicle is operating in an at least semi-autonomous mode thereof; wherein the controller is configured to communicate with a human machine interface (HMI) of the vehicle and wherein the controller is further configured to control said HMI to issue a notification indicating that a user-defined boundary is required when said first zone does not satisfy a space requirement of a manoeuver that a user has indicated the vehicle should perform.

17. A method of operating a vehicle, the method comprising: receiving, from sensors mounted on the vehicle, environment data indicative of an environment proximal to the vehicle; receiving boundary data indicative of the position of a tangible user-defined boundary that may be physically placed proximal the vehicle by a user; defining a first zone of the terrain proximal the vehicle; adjusting the first zone based on said boundary data; inhibiting the vehicle from travelling outside of the first zone when the vehicle is operating in an at least semi-autonomous mode thereof; communicating with a notification means of the vehicle; and controlling said notification means to issue a notification indicating that a user-defined boundary is required when said first zone does not satisfy a space requirement of a manoeuver that a user has indicated the vehicle should perform.

18. A computer program product executable on a processor so as to implement the method of claim 17.

19. A vehicle comprising a system as claimed in claim 1.

\* \* \* \* \*